US012491678B2

(12) United States Patent
Aubee et al.

(10) Patent No.: US 12,491,678 B2
(45) Date of Patent: Dec. 9, 2025

(54) BIAXIALLY ORIENTED MDPE FILM

(71) Applicant: NOVA CHEMICALS (INTERNATIONAL) S.A., Fribourg (CH)

(72) Inventors: Norman Aubee, Okotoks (CA); Owen Lightbody, Calgary (CA); Maryam Fereydoon, Calgary (CA); Bronwyn Gillon, Calgary (CA); Patrick Lam, Calgary (CA); Shivendra Goyal, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 559 days.

(21) Appl. No.: 17/770,822

(22) PCT Filed: Oct. 19, 2020

(86) PCT No.: PCT/IB2020/059816
§ 371 (c)(1),
(2) Date: Apr. 21, 2022

(87) PCT Pub. No.: WO2021/079255
PCT Pub. Date: Apr. 29, 2021

(65) Prior Publication Data
US 2022/0402192 A1 Dec. 22, 2022

Related U.S. Application Data

(60) Provisional application No. 63/045,383, filed on Jun. 29, 2020, provisional application No. 62/924,833, filed on Oct. 23, 2019.

(51) Int. Cl.
B29C 55/00 (2006.01)
B29C 48/00 (2019.01)
B29C 55/14 (2006.01)
B29K 23/00 (2006.01)

(52) U.S. Cl.
CPC ........ B29C 55/005 (2013.01); B29C 48/0018 (2019.02); B29C 55/143 (2013.01); B29K 2023/0641 (2013.01); B29K 2995/0053 (2013.01); B29K 2995/0063 (2013.01)

(58) Field of Classification Search
CPC . B29C 55/005; B29C 48/0018; B29C 55/143; B29D 7/01; B29K 2023/0641; B29K 2995/0053; B29K 2995/0063
See application file for complete search history.

(56) References Cited

U.S. PATENT DOCUMENTS

| | | |
|---|---|---|
| 2,862,917 A | 12/1958 | Du Pont |
| 3,380,978 A | 4/1968 | Du Pont |
| 3,663,662 A | 5/1972 | Golike et al. |
| 4,383,093 A | 5/1983 | Shiraki et al. |
| 4,472,330 A * | 9/1984 | Ashcraft .............. B32B 7/027 264/491 |
| 4,590,020 A | 5/1986 | Itaba et al. |
| 4,870,122 A | 9/1989 | Lu |
| 4,916,025 A | 4/1990 | Lu |
| 5,043,204 A | 8/1991 | Itaba et al. |
| 5,241,030 A | 8/1993 | Barry et al. |
| 5,519,098 A | 5/1996 | Brown et al. |
| 5,589,555 A | 12/1996 | Zboril et al. |
| 5,589,561 A | 12/1996 | Barry et al. |
| 5,725,962 A | 3/1998 | Bader et al. |
| 5,885,721 A | 3/1999 | Su et al. |
| 5,891,555 A | 4/1999 | O'Brien |
| 6,084,042 A | 7/2000 | Jaber et al. |
| 6,168,826 B1 | 1/2001 | Su et al. |
| 6,303,233 B1 | 10/2001 | Amon et al. |
| 6,387,529 B1 | 5/2002 | Peet |
| 6,469,137 B1 | 10/2002 | Petrov et al. |
| 6,479,137 B1 | 11/2002 | Joyner et al. |
| 6,518,372 B1 | 2/2003 | Weickert |
| 6,689,857 B1 | 2/2004 | Larter et al. |
| 6,764,751 B2 | 7/2004 | Poirier |
| 6,946,203 B1 | 9/2005 | Lockhart et al. |
| 8,080,294 B2 | 12/2011 | Lu |
| 8,962,755 B2 | 2/2015 | Wang et al. |

(Continued)

FOREIGN PATENT DOCUMENTS

| | | |
|---|---|---|
| CA | 703704 A | 2/1965 |
| CA | 849081 A | 8/1970 |

(Continued)

OTHER PUBLICATIONS

ASTM D1003-11—Standard Test Method for Haze and Luminous Transmittance of Transparent Plastics—Copyright ASTM International—Current edition approved Apr. 15, 2011. Published Apr. 2011. Originally approved in 1949. Last previous edition approved in 2007 as D1003-07 (pp. 1-7).

ASTM D1525-07—Standard Test Method for Vicat Softening Temperature of Plastics—Copyright ASTM International—Current edition approved Mar. 1, 2007. Published Mar. 2007. Originally approved in 1958. Last previous edition approved in 2006 as D1525-06 (pp. 1-9).

ASTM D1922-09—Standard Test Method for Propagation Tear Resistance of Plastic Film and Thin Sheeting by Pendulum Method—Copyright ASTM International—Current edition approved May 1, 2009. Published Jun. 2009. Originally approved in 1961. Last previous edition approved in 2008 as D1922-08 (pp. 1-7).

(Continued)

*Primary Examiner* — Abbas Rashid
*Assistant Examiner* — Elisa H Vera
(74) *Attorney, Agent, or Firm* — Thomas J. Styslinger

(57) ABSTRACT

A Biaxially Oriented Polyethylene (BOPE) process uses a selected polyethylene having a medium density and a very broad molecular weight distribution. The use of this selected polyethylene facilitates stretching in the BOPE process in comparison to previously used polyethylene resins having a higher density and/or a narrower molecular weight distribution.

10 Claims, No Drawings

(56) References Cited

U.S. PATENT DOCUMENTS

| | | | |
|---|---|---|---|
| 9,062,138 B2 | 6/2015 | Ker et al. | |
| 9,074,082 B2 | 7/2015 | Wang et al. | |
| 9,221,966 B2 | 12/2015 | Wang et al. | |
| 9,371,442 B2 | 6/2016 | Wang | |
| 9,475,927 B2 | 10/2016 | Wang et al. | |
| 9,676,169 B2 | 6/2017 | Paulino | |
| 9,724,901 B2 | 8/2017 | Lu | |
| 9,758,653 B2 | 9/2017 | Wang et al. | |
| 9,783,663 B2 | 10/2017 | Wang | |
| 9,783,664 B1 | 10/2017 | Wang | |
| 9,963,529 B1 | 5/2018 | Kazemi et al. | |
| 10,040,261 B2 | 8/2018 | Mcleod et al. | |
| 10,071,826 B2 | 9/2018 | Wang | |
| 10,071,895 B2 | 9/2018 | Wang et al. | |
| 10,093,780 B2 | 10/2018 | Wang et al. | |
| 10,189,922 B2 | 1/2019 | Goyal et al. | |
| 10,239,976 B2 | 3/2019 | Goyal et al. | |
| 10,329,412 B2 | 6/2019 | Wang et al. | |
| 10,363,700 B2 | 7/2019 | Yun et al. | |
| 10,584,523 B2 | 3/2020 | Wang | |
| 10,625,914 B2 | 4/2020 | Wang et al. | |
| 10,792,899 B2 | 10/2020 | Pan et al. | |
| 11,046,491 B2 | 6/2021 | Wang et al. | |
| 11,046,843 B2 | 6/2021 | Konaganti et al. | |
| 11,149,137 B2 | 10/2021 | Wang et al. | |
| 11,279,819 B2 | 3/2022 | Wang et al. | |
| 11,306,196 B2 | 4/2022 | Wang et al. | |
| 11,312,845 B2 | 4/2022 | Sadeghi et al. | |
| 11,339,278 B2 | 5/2022 | Wang et al. | |
| 11,352,485 B2 | 6/2022 | Wang et al. | |
| 11,359,081 B2 | 6/2022 | Wang et al. | |
| 11,560,468 B2 | 1/2023 | Wang et al. | |
| 11,643,531 B2 | 5/2023 | Wang et al. | |
| 11,958,961 B2 | 4/2024 | Wang | |
| 2001/0021754 A1 | 9/2001 | Weber et al. | |
| 2004/0105944 A1 | 6/2004 | Weber et al. | |
| 2006/0177641 A1* | 8/2006 | Breese | B32B 27/08 428/910 |
| 2010/0129652 A1† | 5/2010 | McLeod | |
| 2013/0209756 A1 | 8/2013 | Squier et al. | |
| 2015/0094418 A1 | 4/2015 | Wang et al. | |
| 2016/0031191 A1† | 2/2016 | Paulino | |
| 2019/0299578 A1 | 10/2019 | Dou et al. | |
| 2020/0061982 A1 | 2/2020 | Ambroise | |
| 2020/0270395 A1* | 8/2020 | Peer | C08G 63/183 |
| 2020/0369014 A1 | 11/2020 | Ambroise | |
| 2021/0115206 A1† | 4/2021 | Toyota et al. | |

FOREIGN PATENT DOCUMENTS

| | | |
|---|---|---|
| EP | 0 929 583 A1 | 4/1998 |
| EP | 1 037 742 A1 | 9/2000 |
| EP | 1 819 510 B1 | 8/2007 |
| EP | 3 335 874 | 6/2018 |
| JP | 2010535273 A † | 11/2010 |
| JP | 2019143142 A † | 8/2019 |
| KR | 101085329 B1 † | 11/2011 |
| WO | WO-97/22470 A1 | 6/1997 |
| WO | WO-98/14491 A1 | 4/1998 |
| WO | WO-2008/136849 A1 | 11/2008 |
| WO | WO-2011/069240 A1 | 6/2011 |
| WO | WO-2014/106052 A1 | 7/2014 |
| WO | WO-2018/005577 A1 | 1/2018 |
| WO | WO-2018/109112 A1 | 6/2018 |
| WO | WO-2021/079255 A1 | 4/2021 |

OTHER PUBLICATIONS

ASTM D2457-13—Standard Test Method for Specular Gloss of Plastic Films and Solid Plastics—Copyright ASTM International—Current edition approved Apr. 1, 2013. Published Apr. 2013. Originally approved in 1965. Last previous edition approved in 2008 as D2457-08 (pp. 1-6).

ASTM D3985-17—Standard Test Method for Oxygen Gas Transmission Rate Through Plastic Film and Sheeting Using a Coulometric Sensor—Copyright ASTM International—Current edition approved Nov. 15, 2017. Published Dec. 2017. Originally approved in 1981. Last previous edition approved in 2010 as D3985-05 (pp. 1-7).

ASTM D5748-95—Standard Test Method for Protrusion Puncture Resistance of Stretch Wrap Film—Copyright ASTM International—Current edition approved Apr. 1, 2012. Published May 2012. Originally approved in 1995. Last previous edition approved in 2007 as D5748-95 (pp. 1-4).

ASTM D6474-12—Standard Test Method for Determining Molecular Weight Distribution and Molecular Weight Averages of Polyolefins by High Temperature Gel Permeation Chromatography—Copyright ASTM International—Current edition approved Dec. 15, 2012. Published Dec. 2012. Originally approved in 1999. Last previous edition approved in 2006 as D6474-99. (pp. 1-6).

ASTM D6988-13—Standard Test Method for Determination of Thickness of Plastic Film Test Specimens—Copyright ASTM International—Current edition approved Apr. 1, 2013. Published Apr. 2013. Originally approved in 2003. Last previous edition approved in 2008 as D6988-08 (pp. 1-7).

ASTM D792-13—Standard Test Method for Density and Specific Gravity (Relative Density) of Plastics by Displacement—Current edition approved Nov. 1, 2013. Published Nov. 2013. Originally approved in 1944. Last previous edition approved in 2008 as D792-08 (pp. 1-6).

ASTM D882-12—Standard Test Method for Tensile Properties of Thin Plastic Sheeting—Copyright ASTM International—Current edition approved Aug. 1, 2012. Published Sep. 2012. Originally approved in 1946. Last previous edition approved in 2010 as D882-10. (pp. 1-11).

ASTM F1249-20—Standard Test Method for Water Vapor Transmission Rate Through Plastic Film and Sheeting Using a Modulated Infrared Sensor—Copyright ASTM International—Current edition approved Jun. 1, 2020. Published Jul. 2020. Originally approved in 1989. Last previous edition approved in 2013 as F1249-13. (pp. 1-6).

Bird et al., "Dynamics of Polymer Liquids. vol. 1: Fluid Mechanics", John Wiley & Sons, 1987, pp. 169-175.

Carreau-Yasuda model, K. Yasuda PhD Thesis, IT Cambridge (1979).

Deslauriers et al., Quantifying short chain branching microstructures in ethylene 1-olefin copolymers using size exclusion chromatography and Fourier transform infrared spectroscopy (SEC-FTIR), Polymer 43, 2002, pp. 159-170.

Graessley et al., "Effect of Long Branches on the Flow Properties of Polymers", Acc. Chem. Res., vol. 10, 1977, pp. 332-339.

International Search Report & Written Opinion of the International Searching Authority issued in PCT Application No. PCT/IB2021/055555, mailed Feb. 24, 2022.

Kanai et al. in the textbook "Film Processing Advances", Hanser Publishers, 2014, Chapter 7.

Kanai et al. in the textbook "Film Processing Advances", Hanser Publishers, 2014, Chapter 8.

Randall et al., "A Review of High Resolution Liquid 13Carbon Nuclear Magnetic Resonance Characterizations of Ethylene-Based Polymers", JMS—Rev. Macromol. Chem. Phys., 1989, pp. 201-317.

Wild et al., "Determination of Branching Distributions in Polyethylene and Ethylene Copolymers", J. Polym. Sci., Part B, Polym. Phys., vol. 20 (3), pp. 441-455.

Yau et al., "Application of Triple-Detector Size Exclusion Chromatography (On-Line Differential Refractometer, Viscometer and Light Scattering Detectors) for the Characterization of Brominated Polystyrene", Int. J. Polym. Anal. Charact., 1996, pp. 151-171.

ASTM D1238-04 Standard Test Method for Melt Flow Rates of Thermoplastics by Extrusion Plastometer—Copyright ASTM International—Current edition approved Mar. 1, 2004. Published Apr. 2004. Originally approved in 1965. Last previous edition approved in 2001 as D1238-01 (pp. 1-13).

Datasheet of Affinity EG 8100G Polyolefin Plastomer, The Dow Chemical Company, Jan. 12, 2016 (2 pages).

(56) References Cited

OTHER PUBLICATIONS

ASTM D 1238-13—Standard Test Method for Melt Flow Rates of Thermoplastics by Extrusion Plastometer—Copyright ASTM International—Current edition approved Aug. 1, 2013. Published Aug. 2013. Originally approved in 1965. Last previous edition approved in 2010 as D1238-10 (pp. 1-16).
ASTM D6474-99 (Reapproved 2006)—Standard Test Method for Determining Molecular Weight Distribution and Molecular Weight Averages of Polyolefins by High Temperature Gel Permeation Chromatography. Copyright ASTM International. Current edition approved Mar. 15, 2006. Published Apr. 2006. Originally approved in 1999. Last previous edition approved in 1999 as D6474-99 (pp. 1-6).
ASTM D792-13 Standard Test Methods for Density and Specific Gravity (Relative Density) of Plastics by Displacement—Copyright ASTM International—Current edition approved Nov. 1, 2013. Published Nov. 2013. Originally approved in 1944. Last previous edition approved in 2008 as D792-08 (pp. 1-6).
ASTM D972-16—Standard Test Method for Evaporation Loss of Lubricating Greases and Oils—Copyright ASTM International—Current edition approved Apr. 1, 2016. Published May 2016. Originally approved in 1948. Last previous edition approved in 2008 as D972-02 (pp. 1-5).
International Search Report & Written Opinion of the International Searching Authority issued in PCT Application No. PCT/IB2020/059816, mailed Jan. 20, 2021.

\* cited by examiner
† cited by third party

BIAXIALLY ORIENTED MDPE FILM

CROSS-REFERENCE TO RELATED APPLICATIONS

This application is a U.S. National Phase Application under 35 U.S.C. § 371 of International Application No. PCT/IB2020/059816, filed Oct. 19, 2020, which claims the benefit of priority to U.S. Provisional Application Nos. 63/045,383, filed Jun. 29, 2020, and 62/924,833, filed Oct. 23, 2019, all of which are incorporated herein by reference in their entirety.

TECHNICAL FIELD

Biaxially oriented polyethylene (BOPE) films are made from medium density polyethylene (MDPE) having a very broad molecular weight distribution.

BACKGROUND ART

It is well known that polymeric films may be oriented by stretching the films in two directions. The films may stretch sequentially—first in the "machine" direction (MD) and then in the "transverse" direction (TD), or simultaneously (with stretching forces being applied in both directions at the same time). One common stretching process is known as the "tenter frame" process. The resulting films are generally referred to as being "biaxially oriented" or "bi-oriented". The tenter frame process is commonly used with films made from polyamide, polyethylene terephthalate (PET) and especially polypropylene (PP). However, the tenter frame process has been less successful with polyethylene (PE) because PE is comparatively difficult to stretch. Some technical success was achieved using high density polyethylene (HDPE) in the tenter frame process—as described in U.S. Pat. No. 6,946,203 (Lockhart et al.).

The use of linear low density (LLDPE) has also been proposed to prepare BOPE: See U.S. Pat. No. 6,469,137 (Joyner et al.) and 10,363,700 (Yun et al.).

We have now discovered that a different type of polyethylene—namely medium density polyethylene (MDPE)—can be used to prepare BOPE films, provided that the MDPE has a very broad molecular weight distribution.

SUMMARY OF INVENTION

In an embodiment, the invention provides a biaxially oriented polyethylene film comprising at least 60 weight percent of a medium density polyethylene having:
1) a density of from 0.94 to 0.95 grams per cubic centimeter.
2) a melt index, $I_2$, as measured by ASTM D1238 at 190° C. using a 2.16 kg load of from 0.2 to 5 grams/10 minutes; and
3) a molecular weight distribution, Mw/Mn, of from 10 to 50.

In another embodiment, the invention provides a process to prepare a biaxially oriented polyethylene film comprising:
A) providing a base structure comprising at least 60 weight % of a medium density polyethylene having:
 1) a density of from 0.94 to 0.95 grams per cubic centimeter.
 2) a melt index, $I_2$, as measured by ASTM D1238 at 190° C. using a 2.16 kg load of from 0.2 to 5 grams/10 minutes; and
 3) a molecular weight distribution, Mw/Mn, of from 10 to 50;
B) stretching said base structure to a degree of from about 3:1 to about 10:1 in the machine direction; and
C) stretching said base structure to a degree of from about 3:1 to about 10:1 in the transverse direction.

DESCRIPTION OF EMBODIMENTS

The tenter frame process is commonly used to prepare biaxially oriented film and is suitable for the present invention. The tenter frame process is well known to persons skilled in the art of film making, so only a brief description is provided herein. The process begins with an extruder that is equipped with a slot die to form a sheet. For convenience, this extruded sheet is referred to herein as the base structure. Once the base structure has been quenched on chill rolls, MD stretching or MD orientation (MDO) is accomplished by pulling the base structure using several rolls that rotate with progressively increasing surface speeds. Following MD stretching, clips (that are attached to chains) grip the edges of the moving web and carry it into an oven. In the oven, the edges of the base structure are drawn apart making the sheet wider, thus providing TD orientation (TDO). The orientation/stretching causes the film to become thinner, proportionally to the orientation or stretch ratios. For example, to prepare a 1-mil finished film with 5:1 stretch ratio in MD and 8:1 stretch ratio in the TD, the process must start out with a 40-mil sheet. Further details are provided by Kanai et al. in the textbook "Film Processing Advances" (2014); Hanser Publishers.

Biaxial orientation may improve toughness, barrier, optics, heat resistance, and stiffness of films. However, conventional PE is not considered to be well suited to the tenter frame process as it has poor stretchability (compared to polypropylene or PET).

The BOPE films prepared according to this disclosure are suitable for use in a wide variety of packaging applications. In an embodiment, the BOPE film may be used in a laminated structure—for example, the BOPE film may be used as the print web when laminated to a sealant web made from a lower density polyethylene. This type of laminated structure may be more easily recycled in comparison to conventional laminated structures that contain a layer of polyester or polypropylene that is laminated to a layer of polyethylene.

MDPE

The medium density polyethylene (MDPE) used in this disclosure has a density of from 0.94 to 0.95 grams per cubic centimeter (g/cc) as measured by ASTM D972.

The MDPE also has a polydispersity index, Mw/Mn, of 10 to 50 (especially from 10 to 30).

In an embodiment, the MDPE has a Mz of from 550,000 to 1,500,000, especially from 600,000 to 1,500,000.

In an embodiment, the BOPE films of this disclosure are made with from 60 to 100 weight % of MDPE having all of the characteristics described above. In an embodiment, the BOPE films comprise from 70 to 90% of this MDPE. In an embodiment, the BOPE films comprise from 80 to 95% of this MDPE and the remaining polymer(s) used to prepare the BOPE film is also a polyethylene (because the use of only polyethylene to prepare the BOPE film allows the film to be more easily recycled in comparison to a film made with a mixture of polymers).

In an embodiment, the MDPE is made with a chromium catalyst in a gas phase polymerization. The resulting MDPE may contain some long chain branching (LCB). In another embodiment, the MDPE is made with a Ziegler Natta catalyst and the resulting MDPE contains little or no LCB.

Blends with Other Polymers

The BOPE films of this disclosure are prepared from a polymer composition comprising at least 60 weight % of the above defined MDPE. It is known in the art of preparing BOPE films using blends of polymers and this is also contemplated by the present disclosure. Examples of polymers that are suitable for use in blends according to this disclosure include:

1) Linear Low Density Polyethylene (LLDPE). In an embodiment, the LLDPE has a melt index (I2) of from 0.1 to 10 (especially from 0.9 to 2.3) grams per 10 minutes and a density of from 0.89 to 0.935 grams per cubic centimeter;
2) High Density Polyethylene (HDPE), especially HDPE having a melt index (I2) of from 0.1 to 10 (especially from 0.4 to 0.9) grams per 10 minutes and a density of at least 0.95 grams per cubic centimeter; and
3) High Pressure Low Density Polyethylene (HPLD) which is prepared by the free radical polymerization of ethylene, especially HDLD having a melt index (I2) of from 0.1 to 10 grams per minutes and a density of from 0.92 to 0.94 grams per cubic centimeter.

For clarity, the term LLDPE as used herein is meant to include "plastomers", where the term plastomer is a subset of the LLDPE family having a relatively low density of from 0.89 to 0.91 g/cc.

Multi-Layer Base Structures

It is known in the art of preparing BOPE films to use a multi-layer film as the (unstretched) starting film. These starting films are comparatively thick before being stretched and are often referred to as a "sheet" instead of a film. For convenience, such an unstretched, multi-layer sheet may be referred to as a "base structure". Suitable base structures according to this disclosure contain at least 60 weight % of the above defined MDPE, based on the total weight of the base structure. In an embodiment, the MDPE forms a "core" layer (i.e. an interior layer of a multi-layer base structure).

Examples of polymers that may be used to prepare other layers include the LLDPE; HDPE and HPLD described above.

In an embodiment, the multi-layer base structure contains at least three layers including two skin layers (i.e. the layers on each exterior surface of the base structure) and one or more core layers. In an embodiment, one skin layer may be made from HDPE and the other skin layer is a seal layer, as disclosed in published U.S. Patent Application No. 2016/000031191 (referred to hereafter as "Paulino '191"). As disclosed in Paulino '191, the seal layer may comprise a LLDPE (particularly when polymerized with a metallocene catalyst); "plastomers"; elastomers and blends thereof. The use of ethylene-octene plastomers (and blends of those elastomers with another LLDPE; HDPE and/or HPLD) may also be used in a seal layer. Furthermore, the use of plastomers in skin layers may improve the optical properties of the BOPE film so it is also contemplated to use these plastomers (or blends that contain plastomers) in both skin layers. In an embodiment, the core layer comprises the MDPE defined in claim 1 and both skin layers comprise an ethylene-octene plastomer. In another embodiment, a multilayer structure that contains at least 5 layers may have two external skin layers made from a plastomer and two "adjacent-to-skin" layers that are made from a blend of a plastomer and a polyethylene having a higher density.

In addition, it is also known to use a layer of a "barrier resin" to improve the barrier properties of BOPE films. Examples of suitable barrier resins include Ethylene-Vinyl Alcohol (EVOH) and polyamide.

The polymers used in the present disclosure will typically contain an antioxidant (such as a hindered phenol; a phosphite or a blend of both) in conventional amounts, as is well known to those skilled in the art. Other, optional additives include antiblocks; slip agents and nucleating agents (such as those that are disclosed in Paulino '191. Furthermore, the use of zinc glycerolate as an (optional) nucleating agent is also contemplated (this nucleating agent is commercially available, for example, under the trademark IRGASTAB® 287).

EXAMPLES

The invention is further illustrated by the following non limiting examples. Test Methods Melt index was determined according to ASTM D1238 (at 190° C., using a 2.16 kg load, "condition $I_2$," and is reported in grams/10 minutes).

Density was determined according to ASTM D972 and is reported as g/cc.

Mn, Mw and Mz (g/mol) were determined by high temperature Gel Permeation Chromatography (GPC) with differential refractive index (DRI) detection using universal calibration (e.g. ASTM-D6474-99). GPC data was obtained using an instrument sold under the trade name "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("Mn") and 5.0% for the weight average molecular weight ("Mw"). The molecular weight distribution (MWD) is the weight average molecular weight divided by the number average molecular weight, Mw/Mn. The term "polydispersity index" also refers to Mw/Mn. The z-average molecular weight distribution is Mz/Mn. Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 mL. The raw data were processed with CIRRUS® GPC software. The columns were calibrated with narrow distribution polystyrene standards. The polystyrene molecular weights were converted to polyethylene molecular weights using the Mark-Houwink equation, as described in the ASTM standard test method D6474.

Other test methods that may be used to characterize BOPE films are summarized in Table 1.

TABLE 1

| | Part A: Test Methods |
|---|---|
| Dart Impact (g/mil) | Dart impact strength was measured in accordance with ASTM D-1709-04 (Method A). |
| Tear (g/mil) | Machine (MD) and transverse (TD) direction Elmendorf tear strengths were measured in accordance with ASTM D-1922. |
| 1% Sec Modulus (MPa) | The tensile properties such as secant modulus (MD and TD) were measured at a crosshead speed of 0.2 in/min (0.508 cm/min) up to 10% strain in accordance with ASTM D-882-10. The 1% secant modulus (MD and TD) was determined by an initial slope of the stress-strain curve from an origin to 1% strain. |
| 2% Sec Modulus (MPa) | The 2% secant modulus (MD and TD) was determined by an initial slope of the stress-strain curve from an origin to 2% strain. |
| Tensile Break Strength | ASTM D882-12 |
| Elongation at Break | ASTM D882-12 |
| Tensile Yield Strength | ASTM D882-12 |
| Tensile Elongation at Yield (%) | ASTM D882-12 |
| Gloss at 45 degrees | ASTM D2457-13 |
| Haze (%) | ASTM D1003-13 |
| Dynatup Total Energy (Ftlb) | Instrumented impact testing was conducted using an instrument sold under the name DYNATUP ™ Impact Tester (purchased from Illinois Test Works Inc., Santa Barbara, Calif., USA). Testing was completed according to the following procedure. Test samples are prepared by cutting about 5 inch (12.7 cm) wide and about 6 inch (15.2 cm) long strips from a roll of blown film; film was about 1 mil thick. Prior to testing, the thickness of each sample was accurately measured with a handheld micrometer and recorded. ASTM conditions were employed. Test samples were mounted in the 9250 DYNATUP Impact drop tower/test machine using the pneumatic clamp. DYNATUP tup #1, 0.5 inch (1.3 cm) diameter, was attached to the crosshead using the Allen bolt supplied. Prior to testing, the crosshead is raised to a height such that the film impact velocity is 10.9 ± 0.1 ft/s. A weight was added to the crosshead such that: 1) the crosshead slowdown, or tup slowdown, was no more than 20% from the beginning of the test to the point of peak load; and 2) the tup must penetrate through the specimen. If the tup does not penetrate through the film, additional weight is added to the crosshead to increase the striking velocity. During each test, the DYNATUP Impulse Data Acquisition System Software collected the experimental data (load (lb) versus time). At least 5 film samples are tested and the software reports the following average values: "DYNATUP Maximum (Max) Load (lb)", the highest load measured during the impact test; "DYNATUP Total Energy (ft · lb)", the area under the load curve from the start of the test to the end of the test (puncture of the sample), and; "DYNATUP Total Energy at Max Load (ft · lb)", the area under the load curve from the start of the test to the maximum load point. |
| Oxygen Transmission Rate (OTR) (cm3/100 in2/day) | ASTM D3985-81 |
| MVTR (g/100 in2/day) | Moisture Vapor Transmission Rate ("MVTR", expressed as grams of water vapor transmitted per 100 square inches of film per day at a specified film thickness (mils), or $g/100\ in^2/day$) was measured in accordance with ASTM F1249-90 (at 100° F. (37.8° C.) and 100% relative humidity). |

Part B: Preparation of BOPE Films

Biaxially oriented polyethylene (BOPE) films were prepared in a tenter frame process using conditions that are described below.

A. Preparation of Unstretched Film (or "Base Structure")

A multi-layer (three layer) sheet, is co-extruded from three single screw extruders through a 12 inch casting die where the melt streams are combined in the multicavity die prior to extrusion. After extrusion from the die, the multi-layer sheet is chilled and quenched on a two-roll horizontal design with air knife. For convenience, this unstretched multilayer sheet is sometimes referred to herein as a "base structure". The weight of polymer used in each of the three layers is indicated by an A/B/C format. For example, a base structure having two exterior layers (or skin layers) that each contain 5 weight % of the total polymer and a core layer containing 90% is described as 5/90/5.

B. Biax Process

A sequential stretching process was used in this example. The stretching/orientation in the machine direction was performed first. The "oriented" sheet was then stretched in the transverse direction—in some (comparative) examples, it was not possible to stretch the films in both the MD and TD directions.

Machine direction orientation (MDO) can be produced using single stage, or two-stage, Compression Roll Drawing (CRD), at temperatures up to 275° F. and draw ratios up to 7.5:1.

The transverse direction orientation (TDO) was produced in multiple zones: preheat, stretch zone, and annealing, plus one cooling zone. Stretch zone temperatures were up to 280° F., draw ratio up to 12:1.

MDO is achieved by pre-heating the base structure and stretching the sheet between two rolls that are turning at different speeds. The difference in the speeds of the rolls determines the stretch ratio. Stretching can be performed in one set of draw rolls or performed over a series of draw rolls. The stretching is generally performed at temperatures below the crystalline melting temperatures of the film (Tm).

The MDO film is fed into the tenter frame oven using clips on chains attached to rails, and pre-heated. The film is stretched as the rails diverge from one another which pull the edges of the film causing the web to stretch. The width of the film is set by the distance between the rails and can be adjusted to achieve the desired stretch ratio. TDO is performed at a similar or slightly higher temperatures than MDO.

A summary of process conditions is provided below:

| | |
|---|---|
| Target Melt Temperature in Extruders | 465-475° F. |
| Die Width (in) | 12 |
| Layer Ratio | 5/90/5 |
| Casting Roll Temperature (° F.) | 120-150° F. |
| Casting Roll Speed (ft/min) | 15 |
| MDO Draw Roll Temperatures (° F.) | 190 (250° F.) |
| MDO Draw Ratio | 4.75:1-6.5:1 |
| Tenter Frame Stretch Zone Temperature (° F.) | 230-255° F. |
| TDO | 7:1-9:1 |

Example 1

Comparative BOPE films were made with the HDPE polymers shown in Table 2.

TABLE 2

| | | | | | |
|---|---|---|---|---|---|
| Comparative HDPE | | | | | |
| Polyethylene | HDPE-1 | HDPE-2 | HDPE-3 | HDPE-4 | HDPE-5 |
| Density (g/cm$^3$) | 0.9574 | 0.961 | 0.9504 | 0.9571 | 0.9536 |
| Melt Index I$_2$(g/10 min) 190° C. | 0.4 | 0.72 | 0.46 | 0.98 | 1.11 |
| Stress Exponent | 1.86 | 1.78 | 1.76 | 1.38 | 1.34 |
| Branch Freq/1000 C | <0.5 | | 0.9 | <0.5 | 2.1 |
| Comonomer ID | butene | | butene | butene | octene |
| M$_n$ | 19006 | 16610 | 17476 | 34025 | 12835 |
| M$_w$ | 162252 | 149714 | 152478 | 119416 | 92749 |
| M$_z$ | 861161 | 834108 | 885081 | 422209 | 263413 |
| Polydispersity Index (M$_w$/M$_n$) | 8.54 | 9.01 | 8.72 | 3.51 | 7.23 |

Note:
HDPE-4 is sold under the trademark name SCLAIR® 19C by NOVA Chemicals

Qualitative properties of the stretched films made from HDPE are shown in Table 3. These BOPE films are comparative. The use of HDPE to prepare BOPE in the tenter frame process is disclosed in U.S. Pat. No. 6,946,203. This patent specifically identifies SCLAIR 19C as being suitable for the preparation of BOPE (although this patent also teaches that the core layer of the BOPE film should be filled with a particulate in order to reduce density).

TABLE 3

Comparative BOPE Films From HDPE

| Sample | Core (B) | Skins (A/C) | MD Stretch | TD Stretch | Pass or Fail/Ranking |
|---|---|---|---|---|---|
| 1 | HDPE-3 | HDPE-3 | 5.5 | 7 | Pass/7 |
| 2 | HDPE-3 | HDPE-3 | 6 | 7 | Pass/7 |
| 3 | HDPE-5 | HDPE-5 | 5.75 | 7 | Pass/3 |
| 4 | HDPE-1 | HDPE-1 | 5.75 | 7 | Pass/6 |
| 5 | HDPE-4 | HDPE-4 | 7.75 | NA | Fail |

As previously noted, the base structures were prepared using three extruders to provide an A/B/C film structure (with the exterior or "skin" layers being A and C and the core layer B). "MD stretch" and "TD stretch" values in Table 3 show the stretch ratios in the machine direction and the transverse direction (respectively); NA indicates a failure to stretch the base structure adequately.

The final column provides a pass or fail ranking (with pass indicating that it was possible to stretch/orient the films to the degree indicated in Table 3); the "ranking" is a qualitative evaluation of the film appearance, with higher numbers indicating better quality.

(Comparative) Example 2—MDPE

The properties of the medium density polyethylene (MDPE) used in this example are shown in Table 4. Of note, the MDPE has a density of 0.945 g/cc (which is desirable for use in the films of this disclosure and a polydispersity index (Mw/Mn) of 4.52 (which is not broad enough for use in the films of this disclosure).

A base structure was prepared with this MDPE using the procedures described in Part B above (to produce an A/B/C structure with this MDPE used in each of the A, B, and C layers). Attempts to prepare a BOPE film (using the procedures described above) were not successful and were given a "fail" rating.

TABLE 4

MDPE (Comparative)

| | |
|---|---|
| Density (g/cm$^3$) | 0.945 |
| Melt Index I$_2$ (g/10 min) 190° C. | 1.7 |
| Stress Exponent | 1.25 |
| Melt Index I$_2$ (g/10 min) 230° C. | 2 |
| Branch Freq/1000 C | 2.7 |
| Comonomer ID | Octene |
| M$_n$ | 19440 |
| M$_w$ | 87892 |
| M$_z$ | 224656 |
| Polydispersity Index (M$_w$/M$_n$) | 4.52 |

(Inventive) Example 3—MDPE

Properties of the MDPE used in this example are shown in Table 5.

The MDPE used in tis example was made by the copolymerization of ethylene with hexene in a gas phase process using a chromium catalyst.

A base structure was prepared with this MDPE using the procedures described in Part B above (to produce an A/B/C structure, with this MDPE used in each of the A, B and C layers).

A biaxially oriented polyethylene (BOPE) film was prepared from this base structure using the procedures described in Part B above.

A BOPE film prepared with an MD stretch ratio of 4.75 and a TD stretch ratio of 8 was assigned a qualitative appearance rating of 10—i.e. it was clearly superior to the comparative BOPE films made with HDPE (Example 1 above).

TABLE 5

MDPE (Inventive)

| | |
|---|---|
| Density (g/cm$^3$) | 0.9483 |
| Melt Index I$_2$ (g/10 min) 190° C. | 0.39 |
| Stress Exponent | 1.87 |
| Melt Index I$_2$ (g/10 min) 230° C. | 0.76 |
| Branch Freq/1000 C | 2.9 |
| Comonomer ID | hexene |
| M$_n$ | 12987 |
| M$_w$ | 163662 |
| M$_z$ | 1185157 |
| Polydispersity Index (M$_w$/M$_n$) | 12.6 |

Properties of BOPE film made from the inventive MDPE of Table 5 are shown in Table 6.

TABLE 6

| | |
|---|---|
| MD × TD | 4.75 × 8 |
| Film Physical Properties | |
| Thickness Profile Ave | 0.81 |
| Thickness Profile (min-max) | 0.79-0.84 |
| Film Toughness | |
| Dart Impact (g/mil) | 696 |
| Low Friction Puncture - (J/mm) | |
| Puncture (J/mm) | |
| Dynatup Film Max Load (lb) | 25.4 |
| Total Energy (Ftlb) | 0.46 |
| Energy at Max Load (Ftlb) | 0.43 |
| Film Tear Resistance | |
| Tear - MD (g/mil) | 14 |
| Tear - TD (g/mil) | 6 |
| Film Stiffness | |
| 1% Sec Modulus - MD (MPa) | 1338 |
| 1% Sec Modulus - TD (MPa) | 2225 |
| Film Tensile Strength | |
| Tensile Break Str - MD (MPa) | 129 |
| Tensile Break Str - TD (MPa) | 298 |
| Elongation at Break - MD (%) | 129 |
| Elongation at Break - TD (%) | 28 |
| Tensile Yield Str - MD (MPa) | 129 |
| Tensile Yield Str - TD (MPa) | 298 |
| Tensile Energy (J) MD | 3.12 |
| Tensile Energy (J) TD | 1.36 |
| Film Opticals | |
| 45° Gloss | 59 |
| Haze (%) | 8.2 |
| Moisture Vapour Transmission Rate (g/100 in$^2$/24 hr) | 0.3655 |
| Oxygen Transmission Rate (cc/100 in$^2$/24 hr) | 138.74 |

(Inventive) Example 4—MDPE

The MDPE used in this example was prepared by the copolymerization of ethylene with butene in a solution polymerization process using a Ziegler Natta catalyst. Properties of this specific MDPE are shown in Table 7. In a more general embodiment, an MDPE made in this manner having an Mn of from 11,000 to 15,000, an Mz of from 600,000 to 800,000 and an Mw/Mn of from 10 to 12 is suitable for use in the present disclosure.

TABLE 7

| MDPE (Inventive) | |
|---|---|
| Density (g/cm$^3$) | 0.95 |
| Melt Index I$_2$ (g/10 min) 190° C. | 0.85 |
| Comonomer ID | butene |
| M$_n$ | 11,800 |
| M$_w$ | 118,000 |
| M$_z$ | 612,000 |
| Polydispersity Index (M$_w$/M$_n$) | 10.0 |

A base structure was prepared with this MDPE using the procedures described in Part B above (to produce an A/B/C structure, with this MDPE used in each of the A, B and C layers).

A biaxially oriented polyethylene (BOPE) film was prepared from this base structure using the procedures described in Part B above.

A BOPE film prepared with an MD stretch ratio of 6.5 and a TD stretch ratio of 9 was assigned a qualitative appearance rating of 8.

Properties of BOPE film made from the inventive MDPE of Table 7 are shown in Table 8.

TABLE 8

| MD × TD | 6.5 × 9 |
|---|---|
| Film Physical Properties | |
| Thickness Profile Ave | 0.51 |
| Thickness Profile (min-max) | 044-0.57 |
| Film Toughness | |
| Dart Impact (g/mil) | 370 |
| Low Friction Puncture (J/mm) | 15 |
| ASTM Puncture (J/mm) | 42 |
| Dynatup Film Max Load (lb) | 19.8 |
| Total Energy (Ftlb) | 0.32 |
| Energy at Max Load (Ftlb) | 0.30 |
| Film Tear Resistance | |
| Tear - MD (g/mil) | 8 |
| Tear - TD (g/mil) | 11 |
| Film Stiffness | |
| 1% Sec Modulus - MD (MPa) | 1224 |
| 1% Sec Modulus - TD (MPa) | 1999 |
| Film Tensile Strength | |
| Tensile Break Str - MD (MPa) | 141 |
| Tensile Break Str - TD (MPa) | 171 |
| Elongation at Break - MD (%) | 48 |
| Elongation at Break - TD (%) | 12 |
| Tensile Yield Str - MD (MPa) | 118 |
| Tensile Yield Str - TD (MPa) | 172 |
| Tensile Energy (J) MD | 1.1 |
| Tensile Energy (J) TD | 0.3 |

TABLE 8-continued

| Film Optical Properties | |
|---|---|
| Gloss at 45° | 27 |
| Haze (%) | 39 |
| Film Permeability | |
| Moisture Vapor Transmission Rate (g/100 in$^2$/24 hr) | 0.446 |

INDUSTRIAL APPLICABILITY

Biaxially oriented polyethylene (BOPE) films are made from a medium density polyethylene having a very broad molecular weight distribution. These BOPE films are suitable for the preparation of packages that may be used to package a wide variety of consumer goods.

The invention claimed is:

1. A biaxially oriented polyethylene film comprising at least 60 weight percent of a medium density polyethylene having:
   1) A density of 0.94 to 0.95 grams per cubic centimeter;
   2) a melt index, I$_2$, as measured by ASTM D1238 at 190° C. using a 2.16 kg load of 0.2 to 5 grams/10 minutes; and
   3) a molecular weight distribution, Mw/Mn, of 10 to 50;
   wherein said biaxially oriented polyethylene film has at least three layers, and wherein at least one core layer of said biaxially oriented polyethylene film comprises said medium density polyethylene;
   wherein said medium density polyethylene has an M$_z$ of 550,000 to 1,500,000; and
   wherein said medium density polyethylene is made by the copolymerization of ethylene with butene in a solution polymerization process using a Zeigler Natta catalyst or is made by the copolymerization of ethylene with hexene in a gas phase process using a chromium catalyst.

2. The film of claim 1, characterized in that it is stretched in the machine direction to a degree of from about 3:1 to about 10:1.

3. The film of claim 1 characterized in that it is stretched in the transverse direction to a degree of from about 3:1 to about 10:1.

4. The film of claim 2 characterized in that it is stretched in the transverse direction to a degree of from about 3:1 to about 10:1.

5. The film of claim 1, characterized in that it is stretched in the machine direction to a degree of from about 3:1 to about 10:1.

6. A process to prepare a biaxially oriented polyethylene film, the process comprising:
   A) providing a base structure comprising at least 60 weight % of a medium density polyethylene having:
      1) a density of 0.94 to 0.95 grams per cubic centimeter;
      2) a melt index, I$_2$, as measured by ASTM D1238 at 190° C. using a 2.16 kg load of 0.2 to 5 grams/10 minutes; and
      3) a molecular weight distribution, Mw/Mn, of 10 to 50;
   B) stretching said base structure to a degree of about 3:1 to about 10:1 in the machine direction; and
   C stretching said base structure to a degree of about 3:1 to about 10:1 in the transverse direction,
   wherein said base structure comprises at least three layers, and wherein at least one core layer of said base structure comprises said medium density polyethylene;

wherein said medium density polyethylene has an $M_z$ of 550,000 to 1,500,000; and wherein said medium density polyethylene is made by the copolymerization of ethylene with butene in a solution polymerization process using a Zeigler Natta catalyst or is made by the copolymerization of ethylene with hexene in a gas phase process using a chromium catalyst.

7. The process of claim 6, wherein said MDPE has an Mn of from 11,000 to 15,000; an Mz of from 600,000 to 800,000 and an Mw/Mn of from 10 to 12.

8. The process of claim 6, wherein said MDPE is made in a solution polymerization process in the presence of a Ziegler Natta catalyst.

9. The process of claim 6, wherein at least one skin layer of said base structure comprises an ethylene-octene plastomer.

10. The process of claim 9, wherein both skin layers of said base structure comprise an ethylene-octene plastomer.

* * * * *